(12) United States Patent  
Smith

(10) Patent No.: US 7,796,802 B2  
(45) Date of Patent: Sep. 14, 2010

(54) SYSTEM FOR RECORDING AND DISPLAYING ANNOTATED IMAGES OF OBJECT FEATURES

(75) Inventor: Eric M. Smith, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 1023 days.

(21) Appl. No.: 11/527,060

(22) Filed: Sep. 26, 2006

(65) Prior Publication Data

US 2008/0075351 A1  Mar. 27, 2008

(51) Int. Cl.
  *G01R 31/00* (2006.01)
  *G02F 1/1333* (2006.01)
  *G06F 17/308* (2006.01)
(52) U.S. Cl. .................. 382/141; 324/770; 349/138; 707/E17.005
(58) Field of Classification Search .............. 382/141; 362/125, 253, 154, 310; 708/203, E17.005; 84/634; 707/203, E17.005; 349/74, 138; 968/957; 156/305, 306.3, 326, 277; 324/770
See application file for complete search history.

(56) References Cited

U.S. PATENT DOCUMENTS

| | | | |
|---|---|---|---|
| 6,640,004 B2* | 10/2003 | Katayama et al. | 382/154 |
| 6,792,397 B2* | 9/2004 | Yoshikawa et al. | 703/2 |
| 2002/0183995 A1* | 12/2002 | Veitch et al. | 703/7 |

* cited by examiner

*Primary Examiner*—Sheela C Chawan  
(74) *Attorney, Agent, or Firm*—Tung & Associates

(57) ABSTRACT

An inspection operator views features in a part through a transparent touch screen display, and records defects using on-screen annotations which are displayed in visually associated relationship to the corresponding defects. The operator may also call up part attribute information on the display screen. A 3-D position sensing system on the display determines the position and orientation of the display relative to the part, and a computer uses the position information to perform spatial translations which place the display and the part in a common coordinate system. A camera on the display records an electronic image of the part which is combined with the part attribute information and the annotations viewed by the operator on the display.

24 Claims, 3 Drawing Sheets

SYSTEM FOR RECORDING AND DISPLAYING ANNOTATED IMAGES OF OBJECT FEATURES

BACKGROUND OF THE INVENTION

1. Field of the Invention

This invention generally relates to methods and equipment for detecting and recording defects in objects such as manufactured parts, and deals more particularly with a system for generating annotated images of part based on the position of a display used to view the part.

2. Description of the Related Art

In order to maintain quality standards in manufacturing operations, it is important to properly identify, document and communicate defects in manufactured products at many stages of processing. Defect tracking is sometimes difficult because of the confined spaces allocated for quality inspection, changing frames of reference and the need for review and approval by supervisors and engineers.

Current procedures for recording and documenting product defects in the manufacturing environment often involve the use of adhesive tags and/or markers such as chalk. Defect positions are identified by using relative feature information or details from design drawings that are overlaid onto the part or assembly. Most of the details relating to the discovered defects are recorded away from the defect, i.e. on forms or computers, without direct reference to the defect itself.

The defect tracking process described above is less than completely effective, since adhesive tags can become detached, and markers such as chalk can be smeared or removed. Also, persons responsible for product design or quality, such as engineers, must often travel from their offices to the production floor in order to review the defect, and identify and confirm the necessary corrective actions. Moreover, transfer of the defect documentation to responsible parties can be delayed, forgotten or lost over time.

Accordingly, there is a need for an improved system for recording and documenting defects in manufactured products which overcomes the shortcomings of current process described above. The present invention is directed toward satisfying this need.

BRIEF SUMMARY OF THE INVENTION

In accordance with one aspect of the invention, a method is provided for recording defects in a manufactured part or product. The method comprises the steps of: determining the position and orientation of a display relative to the product; viewing the part through the display; generating annotations on the display relating to defects in the part viewed through the display; and, recording an image of the part viewed through the display having the annotations visually associated therewith. Stored information relating to the viewed part is retrieved and displayed along with the annotations. The position and orientation of the display is determined by a 3-D (three dimensional) position sensing system mounted on or enclosed in a housing with the display.

In accordance with another aspect of the invention, a method is provided for inspecting an object, comprising the steps of: viewing the object through a transparent display; generating annotations on the display relating to features on the object; and, recording an image of the object viewed through the display having the generated annotations. The method may further comprise determining the position and orientation of the display using a 3-D position sensing system. The annotations are generated using a touch screen on the display. The method may also include retrieving attribute information relating to the object and recording the attribute information along with the annotated image.

In accordance with a further aspect of the invention, a system for recording defects in an object is provided, comprising: a display including a transparent screen through which an operator may view the object; an input device for allowing the operator to generate annotations relating to defects in the viewed object; a device for recording an image of the object viewed by the operator; and, a programmed computer for displaying annotations on the screen in visually associated relationship to the defects. The system may further comprise a 3-D position sensing system for determining the orientation and position of the display relative to the object. The recording device preferably includes a camera carried on the display. A touch screen forming part of the display allows the operator to input information and instructions into the computer. A memory is provided for storing attribute information relating to the object, and the computer is operative to retrieve the attribute information from memory and display the attribute information along with the annotations.

The system of the present invention is particularly advantageous in that the inspection operator's comments relating to viewed defects are recorded along with an image of the defects and part attribute information which may include part specifications, engineering drawings, work instructions and the like. The recorded image of the defects along with the attribute information and operator annotations can be stored and electronically transmitted to appropriate personnel to allow for remote viewing of the information.

These and other features, aspects and advantages of the invention will become better understood with reference to the following drawings, description and claims.

DETAILED DESCRIPTION OF THE INVENTION

Figure 1:
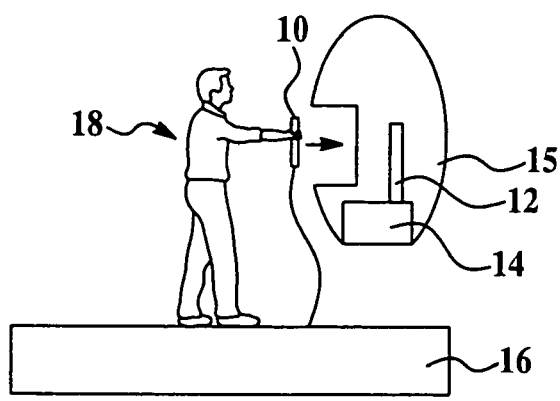
FIG. 1 is a schematic view of a system for recording and displaying annotated images of object features such as defects, in accordance with the invention, and showing an operator positioned at a work station.

Referring first to FIG. 1, the present invention relates to a system for recording and displaying features of an object, such as defects, in a part 12. As used herein, the term "part" includes any object such as a part, product, assembly, subassembly or manufactured product having features that are required to be detected, recorded and displayed for analysis. Further, although the illustrated embodiment involves detection and recording of defects, the system of the present invention can be advantageously used to detect, and record other object features of interest.

Defects in the part 12 are viewed by an inspection operator 18 through a transparent display 10. The part 12 is positioned on a fixed support or base 14 positioned within a confined work area 15, such as an inspection station in a manufacturing environment. The display 10 forms part of a moveable, positional display-based integrated work station carried on a work platform 16. The display 10 can be moved toward or away from the part 12 and oriented (pivoted, tilted, panned, etc.) so that the operator has a visual line-of-sight through the display 10 to the part 12. The distance between the display 10 and the part 12 can be adjusted such that the field-of-view seen by the operator 18 through the display 10 encompasses the entire part 12, or only a portion of the part 12 that is of interest.

Figure 2:
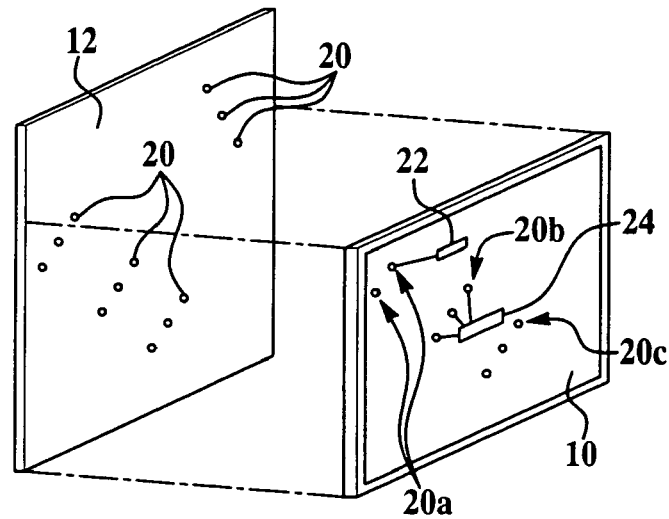
FIG. 2 is a perspective view of the display of the present invention shown in relationship to a part being inspected.
Figure 3:
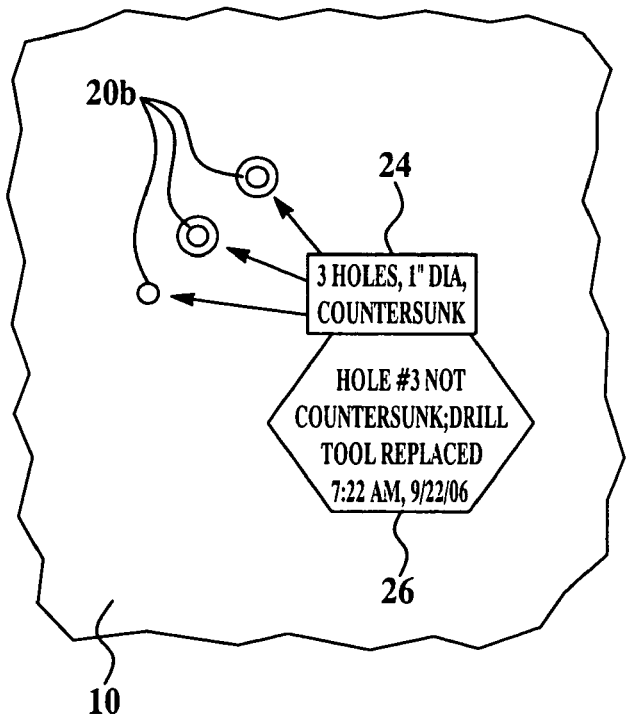
FIG. 3 is an enlarged, fragmentary view of a portion of the display, showing part attribute information and annotations displayed in visually associated relationship to features of the part shown in FIG. 2.

Referring now also to FIGS. 2 and 3, a part 12 is depicted having four sets of aligned through-holes 20 therein which may be formed by a process such as drilling. The display 10 is positioned relative to the part 12 so that only a portion of the part 12 is viewed through the display 10, which includes three sets of the holes 20, namely, holes 20a, 20b and 20c. In FIG. 2, it can be seen that part attribute callouts 22, 24 have been called up and displayed in aligned relationship to holes 20a, 20b. This attribute information may comprise a description of the features, specifications or engineering drawings that are useful in evaluating the features to determine whether there are any manufacturing defects present. This attribute information can be shown on the display 10 either in visually associated relationship with the features (20a, 20b, 20c), or on a different part of the display 10 in the form of a separate window or list. As will be discussed below, the part attribute information is called up by the operator simply by having the operator input the number of the part in a later discussed computer which has access to a database of part-related information.

The part attribute information aids the operator in determining whether any of the features being viewed through the display 10 exhibit defects, or whether features are seen that should not be present. The display 10 is preferably an LCD touch screen display, or at least a section of the display 10 includes touch screen functionality. Thus, the operator can call up the feature attributes, such as those shown in call-outs 22, 24, simply by touching a portion of the screen adjacent to the features, in this case, holes 20a, 20b. Alternatively, the feature attributes can be called up using a keyboard to input instructions to the computer, or a voice command response system which directs the computer to call up the information.

In accordance with the present invention, the operator may add text annotations on the display 10 in order to record notes, observations or directives relative to part features or defects. For example, as shown in FIG. 3, a feature attribute callout 24 calls for three holes of one inch diameter, countersunk at the locations indicated by the arrows. However, as can be seen in this view, one of the holes 20b is not countersunk, possibly as the result of a broken countersink drill tool. The operator has added an annotation 26 indicating hole number three is not countersunk, and that corrective action has been taken in the form of replacing the drill tool on a particular date and time.

The annotation feature can be activated by the operator touching a part of the touch screen display 12 or by using a keyboard or other input device. The text information forming the annotation can be input to the computer using a keyboard, stylus or voice commands as well as other techniques used to input data into computers. It is important to note here, that as is shown in FIG. 3, the attribute information in call-out 24 and the operator's annotations 26, are shown in juxtaposed relationship to each other, and in aligned, visually associated relationship to the part features or defects to which they pertain.

Figure 4:
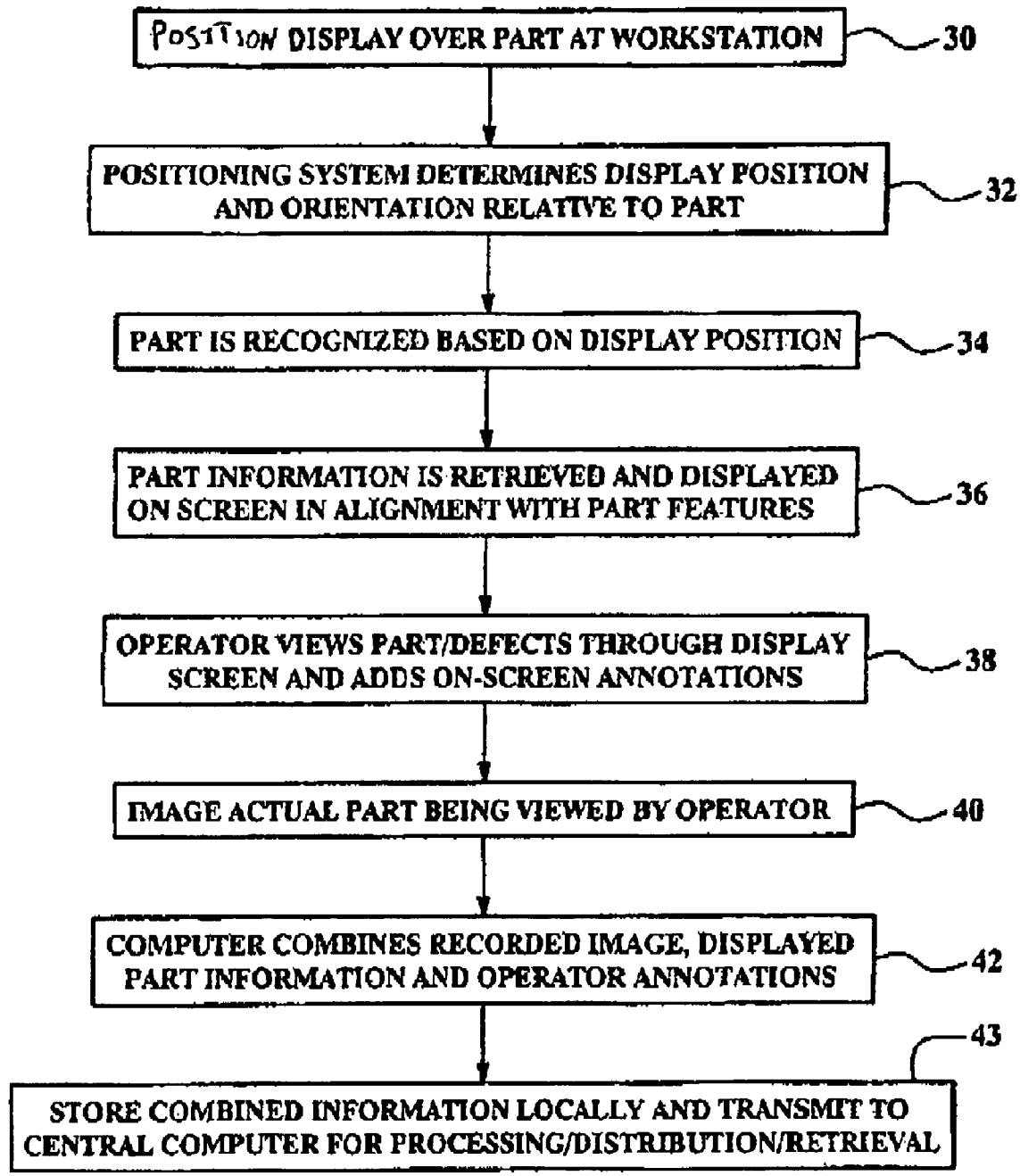
FIG. 4 is a simplified flow diagram showing the steps for carrying out a method in accordance with the system of the present invention.

Attention is now directed to FIG. 4 which shows the basic steps of a method for recording and displaying annotated images of object features. Beginning at step 30, the display 10 is positioned over or in front of a part 12 at a workstation. The operator positions the display 10 such that the appropriate portion of the part 12 is seen through the transparent screen of the display 12. The display recognizes the part based on the position of the display at the workstation. This part recognition feature can be based on equipment location marks at the workstation used to preposition the display 10, or can be performed automatically by the display learning the position it is to be in for inspecting a particular part, and then determining, whether it has been moved to that particular position, using the 3-D position sensing system.

At step 32, a 3-D positioning sensing system carried on the display 10 determines the orientation and position of the display 10 relative to the part 12. This position information is input to a computer which then calculates the position of the display 10 relative to the part 12 and performs appropriate spatial transformations so that the positions of the display 10 and part 12 are defined in a common, 3-D coordinate system. In addition, the computer associates the position of the display with a particular part. Thus at step 34, the part is recognized based on the position and orientation of the display determined in step 32. In effect, the display 10 recognizes that it is viewing a particular part. This can be performed using a memory based look-up table in which a plurality of display positions are uniquely associated with corresponding parts. When the computer recognizes a particular display position, it is able to access attribute information of a part corresponding to the display position.

At step 36, the part attribute information is retrieved and displayed on the screen of the display 10, in visually associated or aligned relationship to part features, such as the previously discussed, countersunk holes 20. However, as previously noted, all or a part of this retrieved part information can be displayed on a separate, dedicated section of the display 10.

At step 38, the operator views the part 12 through transparent display 10 and identifies any defects that may be present. The part feature attributes in the call-outs 24, 26 aid the operator in determining whether the part features being viewed are accurate according to specifications and engineering drawings for the part. The operator then adds any on-screen annotations that may be deemed necessary, and these annotations are displayed in visually associated relationship to the features or defects to which they pertain.

When the operator has completed the inspection process to identify all defects that may be present, the part 12 is imaged by an electronic camera, such as CCD array. The imaging process is initiated by the operator, either through the use of a keyboard, voice commands or the touch screen portion of display 10. Simultaneously, the on-screen information being viewed by the operator on display 10, comprising the attribute callouts 24, 26 and annotations 26, are captured and electronically stored in the computer.

At step 42, the computer combines the image of the part 12 captured at step 40 with the stored information representing the feature callouts and annotations. These two sets of data are combined in a manner such that recall of the combined data produces an image of the part with the feature callouts and annotations displayed exactly as originally viewed by the operator through the display 10. Importantly, the recorded image is based on the position and orientation of the display 10. Consequently, a remote viewer of the recorded, annotated image "sees" what the operator inspector sees who viewed the part 12 through the display 10. It can thus be appreciated that the recorded image is directly dependent on the position and orientation of the display 10.

At step 43, the combined image and callout/annotation data is stored locally in a computer at the workstation and is also transmitted to a central computer where it is stored for further processing or distribution.

Figure 5:
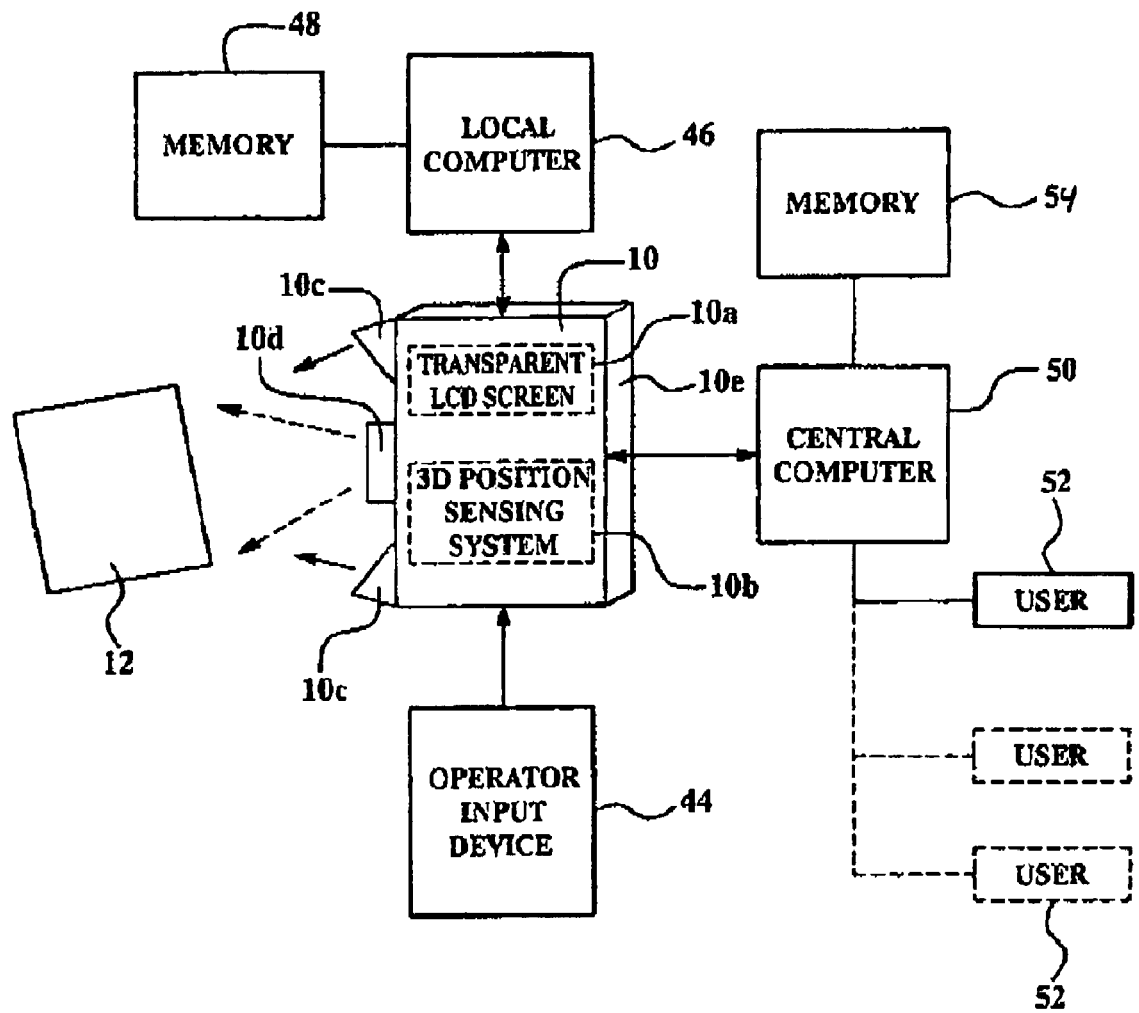
FIG. 5 is a simplified block diagram of the system of the present invention.

FIG. 5 shows additional details of the system of the present invention. The display 10 includes a housing 10e for containing a transparent LCD screen 10a as well as a 3-D position sensing system 10b. The backside of housing 10e has mounted thereon a commercially available, electronic camera 10d having a field of view oriented to image the part 12. One or more strobe lights 10c or other means of illumination are also mounted on the backside of housing 10e to illuminate the part 12 being imaged.

A local computer 46, which may comprise a PC with appropriate application software and a memory 48 is connected to the display 10 and is resident at the workstation. The local computer 46 performs the previously described functions of controlling the camera imaging process, performing spatial translations to determine the relative positions of the display 10 and the part 12 and generating the annotations. The local computer 46 may be a stand alone unit, or may be integrated within the housing 10e. One or more operator input devices 44 are connected to the display 10 and/or the computer 46 to allow the operator to control the camera 10d, retrieve feature attribute information and generate the textual annotations. The input device 44 may comprise one or more of a keyboard, stylus or voice command system, gyroscopic mouse, WACOM tablet, touchpad, or a variety of other devices commonly used to input information.

The display 10 is also connected with a remote computer 50 which includes memory 54 where a variety of information is stored relating to the part 12 and inspections performed by the operator. This stored information may include engineering drawings, specifications, work instructions and other technical information relating to the part 12 which may be retrieved by the operator to aid in the process of detecting, recording and displaying the defects. In addition, the information generated at the display 10 comprising imaged defects with associated operator annotations can be stored in remote memory 54 which can then be accessed by users 52 who are connected in a network with the central computer 50.

Although this invention has been described with respect to certain exemplary embodiments, it is to be understood that the specific embodiments are for purposes of illustration and not limitation, as other variations will occur to those of skill in the art.

What is claimed is:

1. A method of recording defects in a manufactured part, comprising the steps of:
   (A) determining the position and orientation of a transparent display relative to the part, said part located on an opposite side of said transparent display with respect to a user, said determining comprising at least one computer executing programmed instructions residing in memory following positioning and orientation of said display relative to said part;
   (B) viewing the part through the display by said user;
   (C) generating annotations on the display relating to defects in the part viewed through the display, said generating comprising the at least one computer executing programmed instructions residing in memory in response to input by said user; and,
   (D) recording an image of the part viewed through the display in step (B), said recorded image associated with the annotations generated in step (C), said at least one computer storing information comprising said recorded image and said annotations in computer readable media.

2. The method of claim 1, wherein the annotations are visually associated with corresponding defects in the image recorded in step (D).

3. The method of claim 2, wherein the annotations are positioned in juxtaposed relationship to the corresponding defects in the image recorded in step (D).

4. The method of claim 1, further comprising the steps of:
   (E) retrieving said stored information relating to the part viewed in step (B) said retrieving by said at least one computer executing programmed instructions residing in memory; and,
   (F) displaying the information retrieved in step (D) on the display.

5. The method of claim 4, wherein the stored information relates to the production of the part.

6. The method of claim 1, further comprising the step of:
(E) placing the part at a workstation adjacent the display.

7. The method of claim 1, wherein step (C) includes using a touch screen on the display to generate text messages.

8. The method of claim 1, wherein step (A) is performed using a 3-D position sensing system.

9. The method of claim 1, wherein the image recorded in step (D) further includes production information relating to the part.

10. A method of inspecting a manufactured object, comprising the steps of:
    (A) viewing the object through a transparent display by a user, said part located on an opposite side of said transparent display with respect to said user;
    (B) generating annotations on the display relating to features on the object, said generating comprising at least one computer executing programmed instructions residing in memory in response to input by said user; and,
    (C) recording an image of the object viewed through the display in step (A), said recorded image having the annotations generated in step (B), said at least one computer storing said recorded image in computer readable media.

11. The method of claim 10, further comprising the step of using a 3-D position sensing system to determine the position and orientation of the display.

12. The method of claim 10, further comprising the steps of:
    (D) determining the orientation and position of the display relative to the object, said determining comprising said at least one computer executing programmed instructions residing in memory following positioning and orientation of said display relative to said part; and,
    (E) identifying the object based on the position and orientation of the display determined in step (D), said identifying comprising said at least one computer executing programmed instructions residing in memory.

13. The method of claim 10, wherein step (B) includes generating text information by said user using a touch screen on the display.

14. The method of claim 10, further comprising the step of retrieving attribute information relating to the object, and wherein the image recorded in step (C) includes the retrieved attribute information, said retrieving comprising said at least one computer executing programmed instructions residing in memory.

15. The method of claim 10, wherein step (B) includes placing the annotations in visually juxtaposed relationship to the features of the object viewed through the display.

16. A system for recording defects in a manufactured object, comprising:

a display including a transparent screen through which an operator may view the object, said transparent object located on an opposite side of said transparent screen with respect to said operator;

an input device adapted to generate annotations in response to operator input relating to defects in the object viewed through the screen;

a device for recording an image of the object viewed by the user; and, at least one programmed computer for recording and displaying the annotations on the screen in visually associated relationship to the defects.

17. The system of claim 16, further comprising a 3-D position sensing system for determining the orientation and position of the display relative to the object.

18. The system of claim 16, wherein the 3-D sensing system is carried on the display.

19. The system of claim 16, wherein the recording device includes a camera carried on the display.

20. The system of claim 16, further comprising a system carried on the display for illuminating the object.

21. The system of claim 16, wherein the display includes a touch screen portion, said touch screen portion adapted to input information generated by the operator into the computer.

22. The system of claim 16, wherein the input device includes at least one of a touch screen, and keyboard, a stylus and a voice microphone.

23. The system of claim 16, including a memory for storing attribute information relating to the object wherein the at least one computer is operative to retrieve the attribute information from the memory and display the attribute information on the display.

24. The system of claim 16, further comprising a housing, and wherein the display and the computer are contained in the housing.

* * * * *